United States Patent

[11] 3,557,893

[72] Inventor James P. Kohls
 Detroit, Mich.
[21] Appl. No. 704,779
[22] Filed Feb. 12, 1968
[45] Patented Jan. 26, 1971
[73] Assignee Jervis B. Webb Company
 a corporation of Michigan

[54] AUTOMATIC AND MANUALLY CONTROLLED VEHICLE
 13 Claims, 7 Drawing Figs.
[52] U.S. Cl............................................... 180/19,
 180/65, 180/77, 180/79.1, 180/98; 200/61.85,
 200/76; 280/47.37; 287/92
[51] Int. Cl...................................................... B62d 51/04,
 51/04, B62d 5/04, B60k 27/00
[50] Field of Search............................................ 180/19H,
 19, 65, 13, 27, 25, 79.1, 79, 77, 98

[56] References Cited
 UNITED STATES PATENTS
| | | | |
|---|---|---|---|
| 1,692,603 | 11/1928 | Whitney...................... | 180/65 |
| 2,815,083 | 12/1957 | Ellingsworth................ | 180/65X |
| 3,380,546 | 4/1968 | Rabjohn...................... | 180/65X |

*Primary Examiner*—A. Harry Levy
*Attorney*—Farley, Forster and Farley

ABSTRACT: A manual control system for a self-propelled vehicle of the type having an automatic steering servosystem capable of causing the vehicle to follow a guide path, in which a tiller, pivoted on a vertical steering shaft, is biased to a normal inoperative position substantially aligned therewith. Movement of the tiller to an operative position automatically closes a switch which operates to deactivate the automatic steering system, disconnect the steering servomotor and activate a control unit operated by a handle on the tiller for regulating the vehicle propulsion.

PATENTED JAN 26 1971

INVENTOR.
JAMES P. KOHLS
BY Farley, Forster & Farley

ATTORNEYS

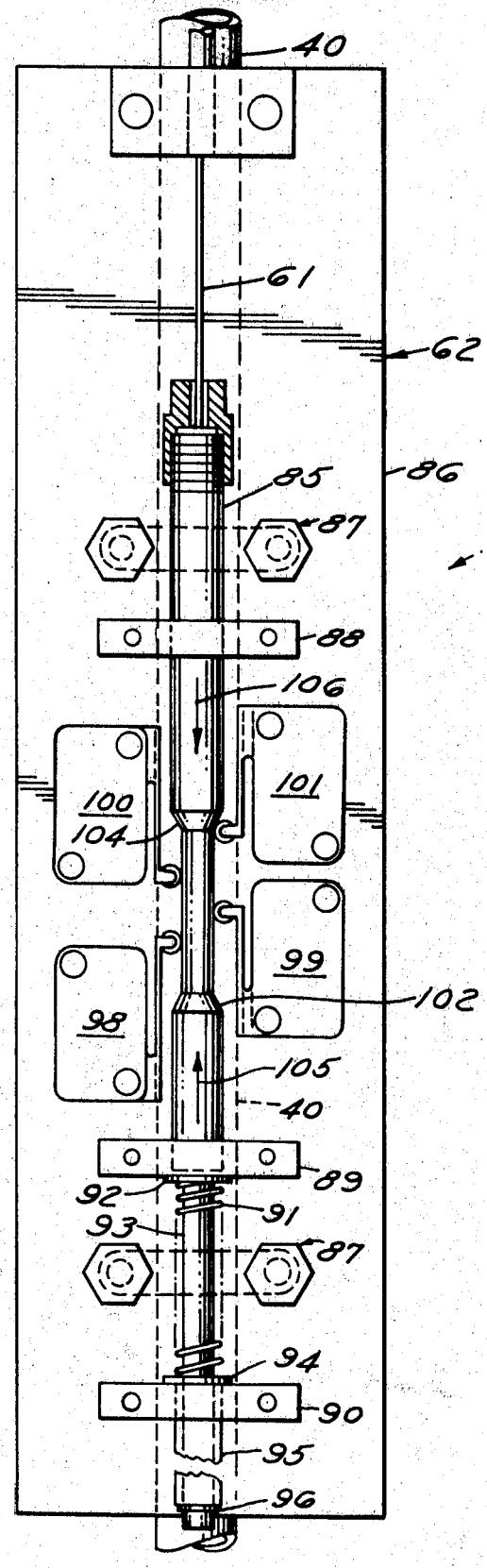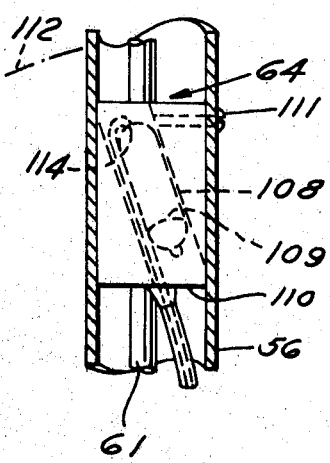

3,557,893

AUTOMATIC AND MANUALLY CONTROLLED VEHICLE

BACKGROUND OF THE INVENTION

1. Field of the Invention

This invention relates to an industrial service type of self-propelled vehicle provided with an automatic steering control system enabling the vehicle to follow a guide path, and with a manual system enabling the vehicle to be controlled by an operator walking ahead of it.

2. Description of the Prior Art

Automatic guidance control systems which enable a self-propelled vehicle to follow a guide path are well known, examples being found in U.S. Pat. No. 2,339,291, and others. Some vehicles of this type developed for industrial uses have also been equipped with manual controls operable from the vehicle.

Other examples are found in the prior art in which vehicles have been equipped with some form of handle or tiller, enabling the vehicle to be steered by a walking operator; and in some cases a control for the vehicle propulsion system has been provided on such a tiller.

SUMMARY OF THE INVENTION

The invention provides, in a self-propelled vehicle of the type having propulsion means including a driving motor for propelling a driving wheel, a steerable wheel and an automatic steering control system capable of regulating the operation of a steering motor connected to the steerable wheel to cause the vehicle to follow a guide path, a manual control system including a steering shaft connected to the steerable wheel, and a tiller pivoted to the steering shaft and biased to an inoperative position in which the tiller is preferably in axial alignment with the steering shaft. The tiller is manually movable to an operative position extending radially of the steering shaft, and propulsion control of the vehicle is afforded by a movable handle on the tiller which operates a control unit for the vehicle driving motor. The vehicle steering motor is connected to the steerable wheel through a clutch. Movement of the tiller to the operative position thereof actuates a switch, and suitable circuit means operating in response to actuation of the tiller switch, deactivates the automatic steering control system, declutches the steering motor from the steering wheel and connects the driving motor control unit with the driving motor.

The overall result is that the vehicle is converted from automatic to manual operation in response to manual movement of a single steering tiller from a normal inoperative to an operative steering position.

Other features of the manual control system include the control unit for the vehicle driving motor, which control unit is mounted on the steering shaft and includes a control cam movable axially of the steering shaft by a push-pull cable connected to the movable handle on the tiller, and a plurality of switch elements selectively actuatable by movement of the control cam.

A link member connects one end of the tiller to one end of the steering shaft, with means for limiting relative pivotal movement between the steering shaft and link, and the link and tiller. Spring elements act on the link and tiller to bias the latter to the inoperative position, and this link type of pivotal connection also serves to limit bending movement of the control cable connecting the movable handle on the tiller to the control cam.

Preferably the manual control system is installed on an upwardly projecting pedestal at the forward end of the vehicle body, the steering shaft passing through the pedestal and the tiller being connected to the upper end of the steering shaft, being movable between a normal inoperative vertical position axially aligned with the steering shaft and a horizontal operative position projecting forwardly of the vehicle.

Other features and advantages of the invention will appear from the description to follow of the representative embodiment disclosed in the accompanying drawings.

BRIEF DESCRIPTION OF THE DRAWING

The drawing comprises the following views:

FIG. 3 is a schematic circuit diagram for the manual control system;

FIG. 6 is an enlarged elevation of the manual driving motor control unit; and,

FIG. 7 is an enlarged sectional detail of the tiller switch.

DESCRIPTION OF THE PREFERRED EMBODIMENT

Figure 1:
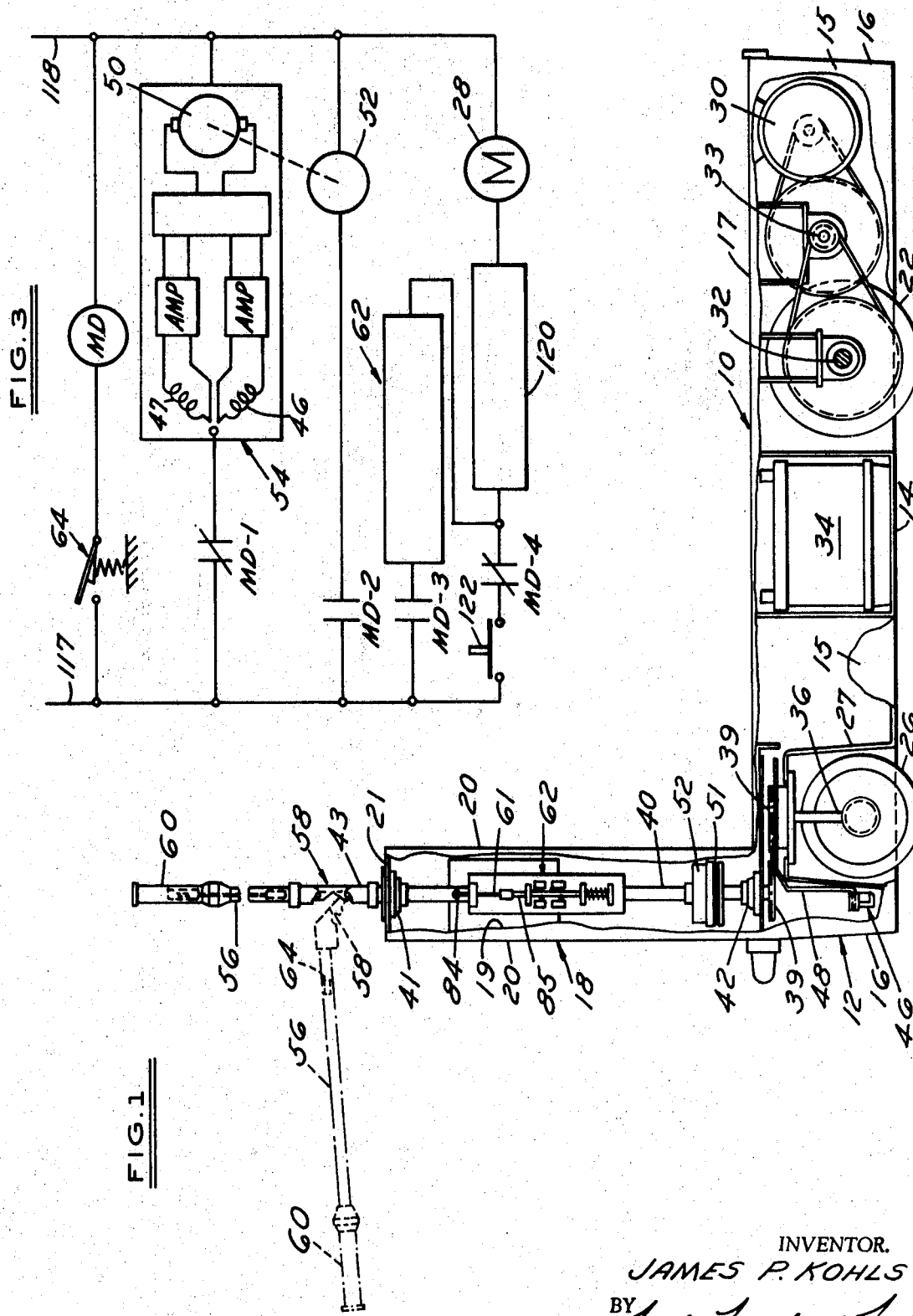
FIG. 1 is a side elevation of a self-propelled vehicle constructed in accordance with the invention, with portions of the body thereof being broken away.
Figure 2:
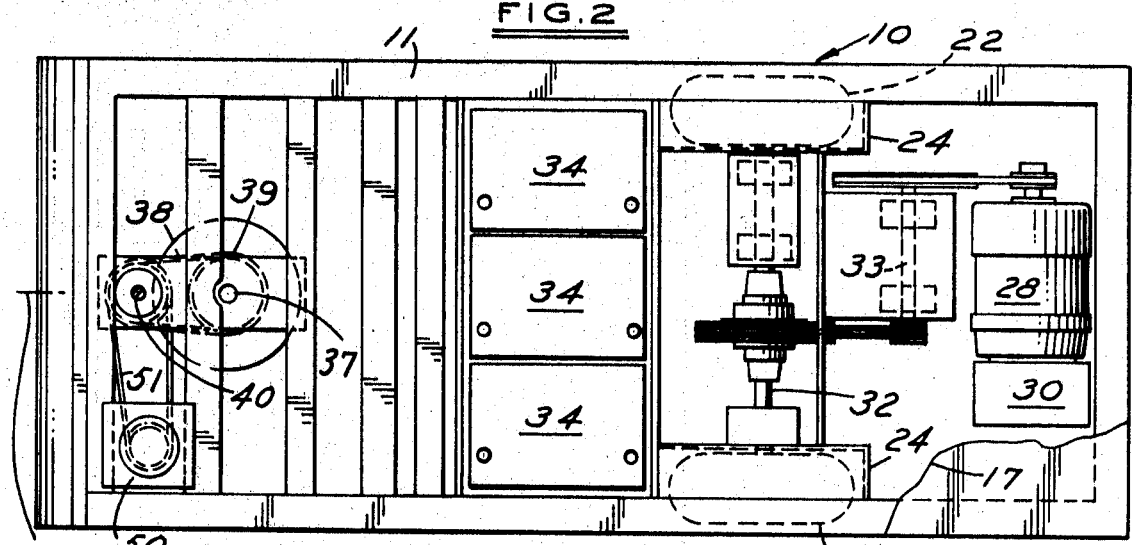
FIG. 2 is a top plan view of the vehicle shown in FIG. 1, again with body portions broken away.

The vehicle 10 of FIGS. 1 and 2 includes a frame 11 of suitable longitudinal and transverse members to which a body is secured, the body comprising an enclosed lower portion 12 having a bottom 14, pairs of side and end walls 15 and 16, and a cover 17 mounted between the upper edges thereof and providing an upper load supporting surface. An upwardly extending pedestal 18 at the front end of the vehicle forms part of the body structure and is enclosed by side, end and top panels 19, 20 and 21. Rear driving wheels 22 and 23 are each recessed within a wheel well 24 formed as part of the body side panels 15; and, a single steerable front wheel 26 is mounted within a well 27 formed as part of the bottom wall 14 of the body.

Propulsion means for driving the rear wheels 22 and 23 are mounted within the body enclosure 12 and include a driving motor 28 equipped with an electric brake 30, and connected to drive the rear axle 32 through a counter shaft 33, with power supplied by batteries 34.

The steerable wheel 26 is supported by a fork 36 including a pivotally supported portion 37 which is connected by a sprocket chain 38 and sprockets 39 to a steering shaft 40. This steering shaft 40 is journaled in bearings 41 and 42 and extends vertically through the pedestal 18, the upper end 43 of the shaft projecting above the top panel 21 of the pedestal.

An automatic steering control system 54 is provided for causing the vehicle to follow a guide path 44 (FIG. 2), and since the construction of such a control system is well known, only the principal components have been illustrated. These components include left and right direction sensing coils 46 and 47 (FIG. 3) mounted on a bracket 48 connected to and movable with the wheel fork 36; a reversible steering servomotor 50 connected to the steering shaft 40 by a sprocket chain 51 and clutch 52; and a control circuit schematically illustrated in FIG. 3 for regulating operation of the steering motor 50 in accordance with signals detected by the coils 46 and 47.

Figure 5:
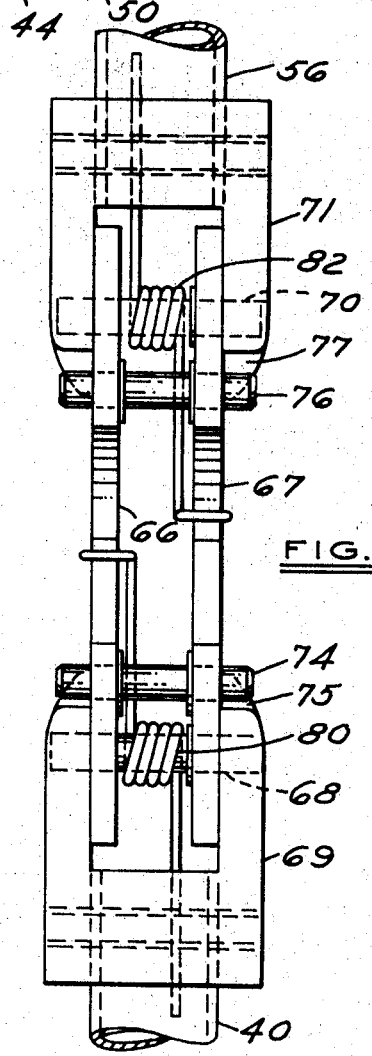
FIG. 5 is an end elevation of the structure shown in FIG. 4.
Figure 4:
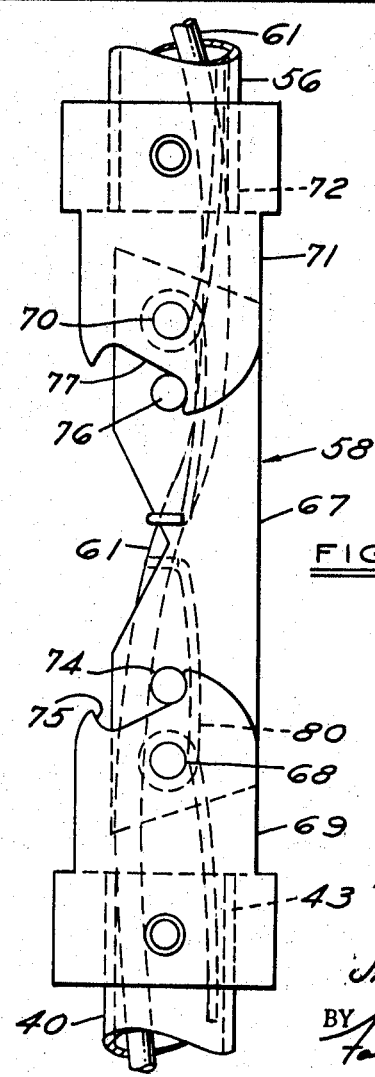
FIG. 4 is an enlarged side elevation showing the connection between the steering shaft and tiller.

The manual control means include a tiller 56 connected to the upper end 43 of the steering shaft 40 by pivot means 58, shown in detail in FIGS. 4 and 5; manual propulsion control means comprising a movable handle 60 mounted on the outer end of the tiller 56 and connected by a push-pull cable 61 to a driving motor control unit 62 mounted on the steering shaft 40 and shown in detail in FIG. 6; and, a switch element 64 mounted in the tiller 56 and illustrated in FIG. 7.

Referring to FIGS. 4 and 5, the pivot means 58 consists of a pair of parallel members 66 and 67 forming a link connected by a pin 68 to a fitting 69 on the upper end 43 of the steering shaft 40 and by a pin 70 to a similar fitting 71 on the end 72 of the tiller 56. Pivotal movement of the link relative to the steering shaft 40 is limited by a transversely extending rod 74 engaging a notch 75 in the fitting 69, and another rod 76 engages a notch 77 in the fitting 71 to similarly limit pivotal movement between the link and the tiller 56. A torsion spring 80 mounted on the pivot 68 acts between the steering shaft and link while a similar spring 82 mounted on the pivot 70 acts between the link and tiller, and the combined effect of the springs 80 and 82 is to normally urge the tiller 56 to a position of substantial axial alignment with the steering shaft 40. The tiller is inoperative in this normal position thereof but may be moved manually to an operative position such as indicated in FIG. 1 in which the tiller extends substantially radial to the axis of the steering shaft 40 and projects forwardly of the vehicle. In this operative position the link members 66 and 67 extend angularly to both the tiller and the steering shaft.

Both the tiller 56 and the steering shaft 40 are tubular. The control cable 61 extends through the tiller and the steering shaft, and the link type of pivot means 58 between the tiller and steering shaft serves to limit bending movement of the cable 61.

Referring to FIGS. 1 and 6, the handle 60 on the outer end of the tiller 56 is of the well known throttle-grip type and has not been shown in detail. Rotary movement of the handle on the longitudinal axis of the tiller imparts linear movement to the movable element of the cable 61 which extends through a hole 84 in the sidewall of the steering shaft 40 and is secured to one end of an elongated switch operating member or cam 85 forming part of the motor control unit 62. This control unit includes a base member 86 secured to the steering shaft 40 by U-bolts 87 and equipped with bearing blocks 88, 89 and 90 which support the cam member 85 for reciprocating movement. A centering spring 91 is mounted on the cam member 85 intermediate the bearing blocks 89 and 90, and acts between a collar 92 slidably mounted on the cylindrical portion 93 of the cam member 85 and a second collar 94 formed as part of a sleeve 95 in which the cylindrical portion 93 slides, with relative movement between the sleeve 95 and cam member 85 limited in one direction by a collar 96 on the portion 93. If the cam member 85 is moved downwardly as the parts are viewed in FIG. 6, the spring 91 is compressed by the collar 92 which moves downwardly with the member 85, the sleeve 95 remaining stationary. Movement of the cam member 85 in the opposite direction results in the spring 91 being compressed by the collar 94 on the sleeve 95 which moves with the member by action of the collar 96.

A plurality of switch elements 98, 99, 100 and 101 are mounted on the base member 86 for selective actuation by lobes 102 and 104 on the cam member 85. For example, switches 98—100 may be arranged to control first, second and third speeds of the driving motor 28 in the forward direction in response to movement of the cam 85 indicated by the arrow 105, while switch 101 controls one speed in reverse by movement of the cam 85 in the direction 106. Movement of the cam member 85 is substantially parallel to the axis of the steering shaft 40 and hence is not affected by rotation of the steering shaft.

Referring to FIGS. 1 and 7, the switch 64 is of the encapsulated mercury type, consisting of a capsule 108 containing a mass of mercury 109 mounted in a holder 110 positioned within the tubular tiller 56 and secured thereto by a screw 111. The holder 110 is formed so that the capsule 108 is positioned in angularly inclined relation to the longitudinal axis of the tiller, FIG. 7 showing the switch 64 with the tiller 56 in its upright inoperative position. Movement of the tiller in the direction indicated by the arrow 112 to operative position will cause the mercury 109 to move to the other end of the capsule and close the contact 114, and the inclined mounting of the capsule insures switch operation within a normal range of vertical tiller movement.

FIG. 3 schematically illustrates the circuit means automatically operable from the switch 64 in response to movement of the tiller between operative and inoperative positions, and showing the latter condition. Movement of the tiller to operative position closes the switch 64, energizing a manual drive relay MD connected in series with the switch 64 between the power lines 117 and 118. Energization of the MD relay opens relay contact MD-1, deactivating the automatic steering control system 54; closes relay contact MD-2, operating the clutch 52 to disconnect the automatic steering control motor 50 from the steerable wheel 26; closes relay contact MD-3 connecting the switches of the motor control unit 62 to an acceleration control 120 for the driving motor 28; and opens contact MD-4 to prevent operation of the motor by an automatic start button 122.

Spring biased return movement of the tiller 56 to upright inoperative position, of course deenergizes the relay MD and returns the contacts MD-1 through MD-4 to the position shown in FIG. 3, automatically placing the vehicle in readiness for a return to automatic guide path operation.

Naturally, modifications to the construction disclosed herein will be necessary in order to adapt the invention to vehicles of other design and dimension.

I claim:

1. In a self-propelled vehicle of the type having propulsion means including a driving motor for propelling a driving wheel, a steerable wheel and an automatic steering control system capable of regulating the operation of a steering motor connected to the steerable wheel to cause the vehicle to follow a guide path; the improvement comprising:

manual control means including a steering shaft and means operably connecting the steering shaft to the steerable wheel;

a tiller, pivot means connecting the tiller to the steering shaft for movement between an inoperative position of the tiller and an operative position thereof in which the tiller extends generally radially of the axis of the steering shaft;

means normally urging the tiller to the inoperative position thereof;

manual propulsion control means including a movable handle on the tiller and a driving motor control unit operable by movement of the handle;

clutch means connecting the steering motor to the steerable wheel; and a switch actuatable in response to movement of the tiller from the inoperative to the operative position thereof, and circuit means operable by such actuation of said switch for deactivating the automatic steering control system, disconnecting the clutch means and connecting the motor control unit with the driving motor.

2. A vehicle according to claim 1 wherein the pivot means connecting the tiller to the steering shaft comprises a link pivotally connected to the tiller and to the steering shaft and extending between adjacent ends thereof, and means limiting relative pivotal movement between the link and steering shaft and the link and tiller; and wherein the means normally urging the tiller to the inoperative position thereof comprises spring means acting between the steering shaft and link and the tiller and link to normally urge the link and tiller to a position of substantial axial alignment with the steering shaft.

3. A vehicle according to claim 2 wherein the tiller and steering shaft are each of tubular construction, and a control cable connected to the tiller handle extends through the tiller and steering shaft, said pivot means serving to limit bending of the control cable as the tiller is moved from said inoperative to said operative position thereof.

4. A vehicle according to claim 3 wherein said motor control unit is mounted on the steering shaft, said motor control unit including a plurality of switches and a switch operating member connected to said control cable, and means mounting said switch operating member for movement in a direction axial of said steering shaft.

5. A vehicle as claimed in claim 4 wherein said clutch means are mounted on said steering shaft.

6. A vehicle according to claim 1 wherein said motor control unit includes a base member, means mounting the base member on the steering shaft, a control cam movably carried by the base member, and a plurality of switch elements mounted on the base member for selective actuation by movement of the control cam.

7. A vehicle according to claim 6 wherein said control cam comprises an elongated member extending generally parallel to the axis of the steering shaft, and means mounting said elongated cam member for reciprocating movement axially of the steering shaft.

8. A vehicle as claimed in claim 1 further comprising an upwardly extending control pedestal at the front end thereof, means mounting the steering shaft in the pedestal, the steering shaft having an upper end projecting above the pedestal, and said pivot means connecting the tiller to the upper end of the steering shaft.

9. A vehicle according to claim 8 wherein said circuit means are mounted in said pedestal.

10. A vehicle as claimed in claim 1 wherein the tiller is formed by a tubular member, and said switch actuable in response to movement of the tiller from inoperative to operative position is of a type employing an encapsulated mercury contact, and means mounting said switch capsule within the tubular tiller member in angularly inclined relation to the longitudinal axis thereof.

11. A vehicle according to claim 1 further comprising a frame, a body having bottom, side and end walls secured to the frame and depending therefrom, cover means mounted between the upper edges of the body side and end walls forming a body enclosure with an upper load supporting surface, and means mounting said propulsion means within the body enclosure.

12. A vehicle according to claim 11 wherein said body further comprises a boxlike pedestal enclosure secured to the frame at the front end of the vehicle and extending upwardly above said load supporting surface.

13. A self-propelled vehicle according to claim 1 further comprising a frame, a body having bottom, side and end walls secured to the frame, cover means mounted between the upper ends of the body side and end walls forming a body enclosure with an upper load supporting surface, the body further including a boxlike pedestal enclosure secured to the frame at the front end of the vehicle and extending upwardly above said load supporting surface; said steering shaft being mounted in and having an upper end projecting above the pedestal, and said pivot means connecting the tiller to the upper end of the steering shaft.